June 18, 1957 B. H. DALTON ET AL 2,796,226
CAMERA CRADLE HEAD
Filed March 29, 1954 3 Sheets-Sheet 1
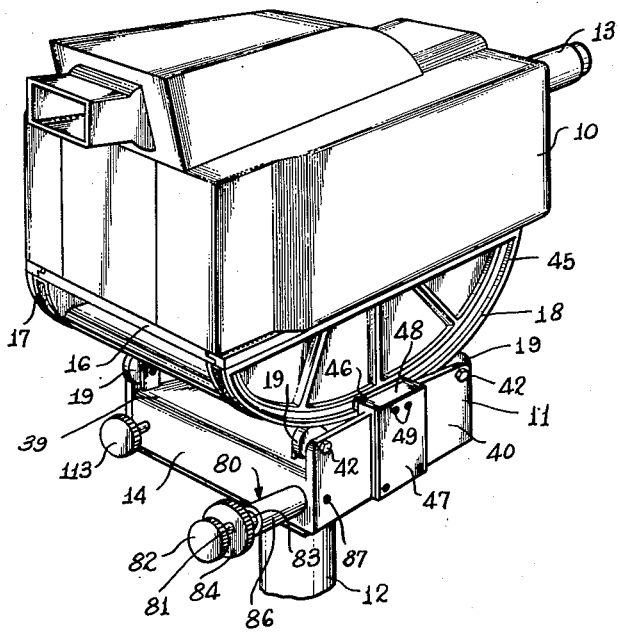
Fig. 1
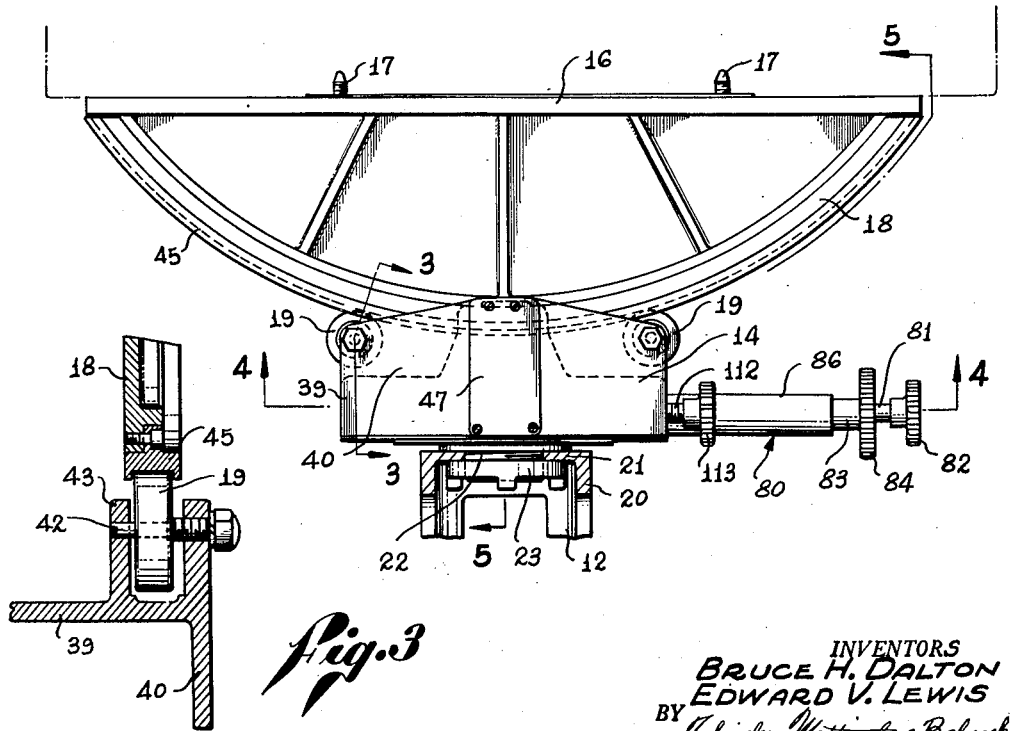
Fig. 2
Fig. 3
INVENTORS
BRUCE H. DALTON
EDWARD V. LEWIS
BY Fulwider, Mattingly & Babcock
Attorneys INVENTORS
BRUCE H. DALTON
EDWARD V. LEWIS
BY
Fulwider Mattingly & Babcock
Attorneys June 18, 1957 B. H. DALTON ET AL 2,796,226
CAMERA CRADLE HEAD
Filed March 29, 1954 3 Sheets-Sheet 3

INVENTORS
BRUCE H. DALTON
EDWARD V. LEWIS
BY
Fulwider Mattingly & Babcock
Attorneys

United States Patent Office 2,796,226
Patented June 18, 1957

2,796,226

CAMERA CRADLE HEAD

Bruce H. Dalton, Los Angeles, and Edward V. Lewis, North Hollywood, Calif., assignors to The Houston-Fearless Corporation, Los Angeles, Calif., a corporation of California Application March 29, 1954, Serial No. 419,311

7 Claims. (Cl. 248—183)

This invention relates generally to a support for a camera permitting both horizontal and vertical movement of the camera, and more particularly to an improved camera head permitting more accurate and rapid positioning of the camera.

An embodiment of the invention is particularly designed for use with large and heavy television cameras, although, it may be used equally well with motion picture cameras or other similar equipment. Such cameras must have freedom of both horizontal and vertical movement so as to be able to take all kinds of action shots. Due to the inertia of the camera and possible unbalanced weight distribution, it is also necessary to be able to stop the movement of the camera by braking means and to lock it firmly in a relatively fixed position. To prevent overswinging of the camera in so-called "pan shots," it is also desirable to provide friction drag means which exert a damping or retarding force on the vertical movement of the camera. This invention is particularly concerned with the improvement of the design and control of the brake and drag means to simplify the work of the camera operator and make possible more accurate and rapid adjustment of the camera position.

With the foregoing in mind, it is a major object of the invention to provide an improved camera cradle head which is more easily controlled and adjusted to different positions.

Another object of the invention is to provide a camera head having brake means for controlling horizontal and vertical movement of the head and cooperating control means for locking or releasing the position of the head.

It is also an object of the invention to provide a camera head having adjustable brake means for controlling the vertical movement of the camera and independently adjustable drag means for exerting a damping force retarding such movement.

A further object of the invention is to provide brake control means having coaxial control connections to both horizontal and vertical brakes whereby both brakes can be controlled from a single hand position by a single operator.

An additional object of the invention is to provide coaxial control means so constructed as to permit both brake means to be operated independently of each other and yet adjacently positioned in axial alignment.

It is still another object of the invention to provide brake means adapted for positive gripping engagement and quickly engaged and released by small hand movements of the control means.

Yet another object of the invention is to provide a head construction of the character described which is of simple and rugged design to give long and trouble-free service.

These and other objects and advantages of the invention will become apparent from the following detailed description of a preferred embodiment thereof, and from an inspection of the accompanying drawings in which:

Figure 1 is a perspective view of the camera cradle head with a camera illustratively mounted thereon;

Figure 2 is a side elevation of the device;

Figure 3 is a sectional detail taken along the line 3—3 of Figure 2;

Figure 4:
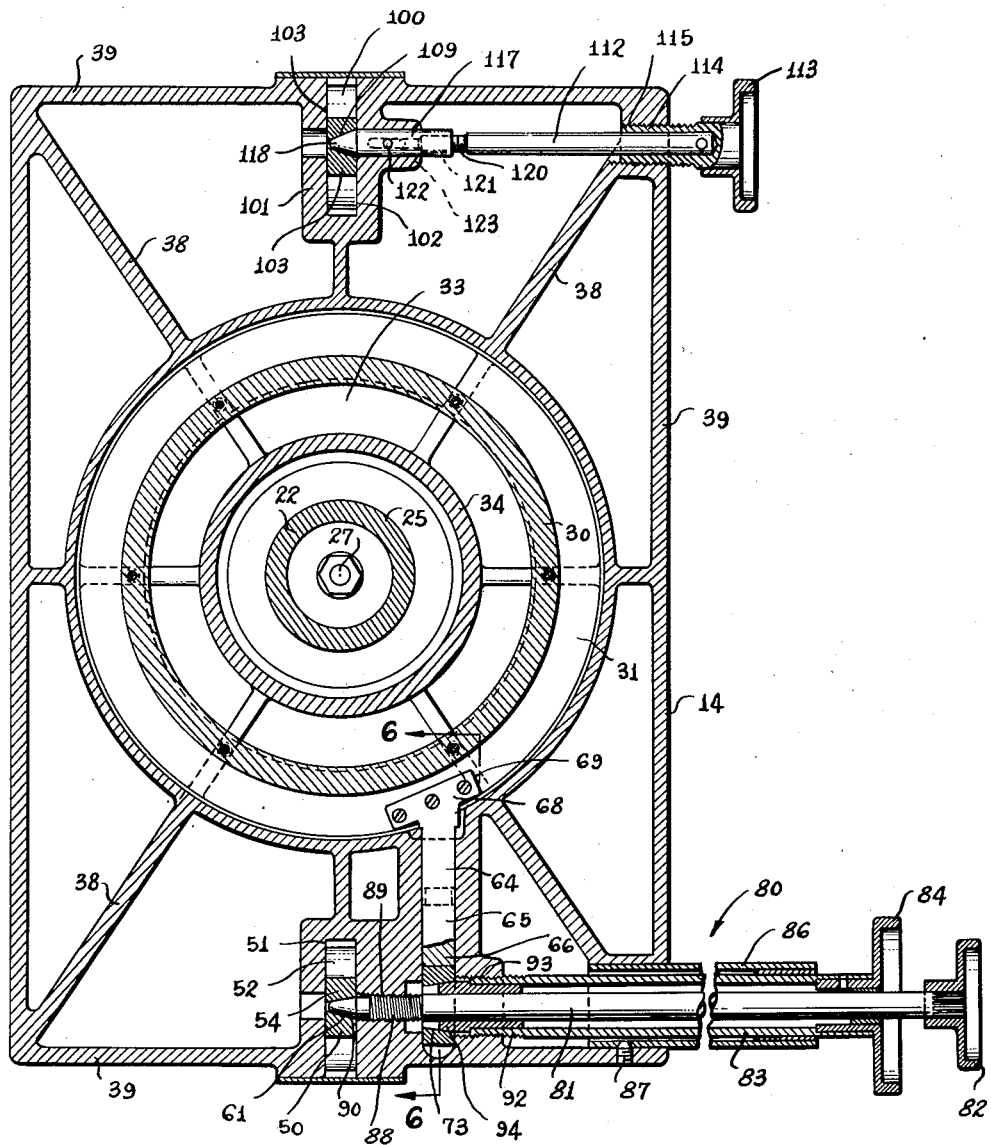
Figure 4 is an upwardly viewed section taken along the line 4—4 of Figure 2.

Referring now to the drawings and particularly to Figure 1, thereof, the numeral 10 indicates generally a large camera, typically a television camera which is quite heavy and yet must be supported to have freedom of both horizontal and vertical movement. Camera 10 is mounted on an embodiment of the camera cradle head 11 which is in turn supported by a suitable standard or base 12. At the front of camera 10 is a lens 13 which is trained and elevated on the subject matter of the scene. An operator stands at the back of the camera and controls the movement of it by suitable hand controls as will be described. Because of its size and weight, camera 10 has substantial inertia, and may not be balanced with the center of gravity exactly over the standard 12 at all times. For these reasons, brake means must be used to prevent rotation or accidental rocking motion from a stationary position. It can also be understood that camera 10 is provided with various other connections and controls not shown herein, and the camera operator has a considerable number of adjustments and controls which he must frequently manipulate.

The cradle head 11, as is best seen in Figure 2, is formed with a lower head structure 14 which is rotatably supported for movement in a horizontal plane. Above head 14 is a support table 16 of rectangular flat shape which carries attachment screws 17 for securing camera 10 thereon.

Support table 16 has extended downwardly therefrom a pair of side rocker arms 18 which are disposed in spaced parallel relationship and are formed of arcuate circular segmental shape. Rocker arms 18 are seated on rollers 19 which are mounted upon head 14 so that support table 16 may be rocked up and down upon the head for movement in a vertical plane.

Figure 5:
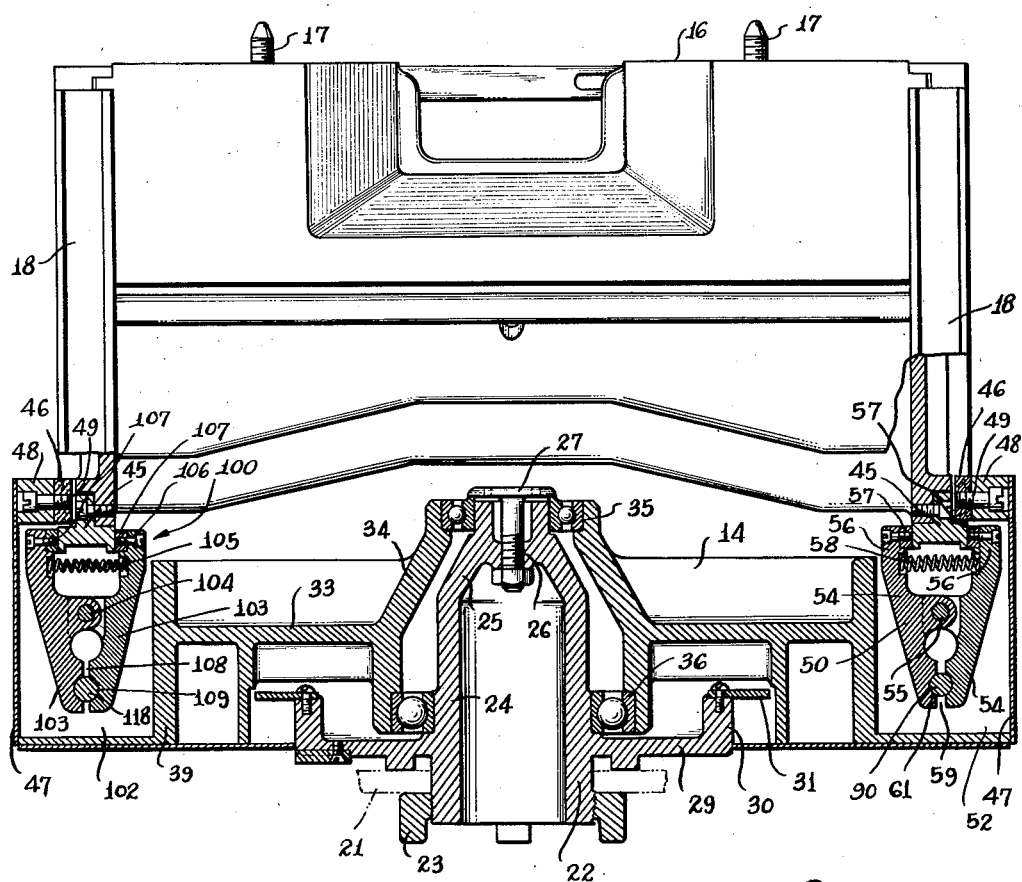
Figure 5 is a cross-section taken along the line 5—5 of Figure 2.

Considering the structure in more detail, the standard 12 has a cylindrical upper end portion 20 which is flanged inwardly at 21 and is adapted to support an upstanding hub 22. The lower end of hub 22 is threaded and is engaged with a lower lock nut 23 which secures the hub rigidly to the base but may be easily removed to permit disassembly of the device. As is best seen in Figure 5, hub 22 is formed with a straight walled tubular portion 24 surmounted by an upper tapered cap 25 having a central bore 26 which takes a cap nut 27.

Formed integrally with the hub 22 is an outwardly projecting lower disc 29 having an upturned outer support rim 30. Secured to the rim 30 is a replaceable annular gripping flange 31 which is so disposed as to have both the upper and lower faces exposed. Preferably, the entire hub is formed as a heavy casting, while the gripping flange 31 is of hard wear resisting metal accurately machined to a smooth surface.

The head 14 may also be formed as a heavy casting with a circular wheel portion 33 having a central sleeve 34 surrounding hub 22. Upper and lower antifriction bearings 35 and 36, respectively, support sleeve 34 on hub 22 for free rotation in a horizontal plane. Upper bearing 35 is removably held in place by the previously mentioned cap nut 27, and the entire head is free floating with respect to base 12 and the gripping flange 31. The outside of wheel 33 is connected by spaced webs 38 to an outer rectangular framework 39 as is best seen in Figure 4 which is of shallow boxlike shape.

The sides of framework 39 project upwardly as is best seen in Figures 1 and 2 to form supports 40 for mounting rollers 19 in spaced pairs that are symmetrically disposed with respect to the axis of hub 22. Rollers 19 are rotatably journaled on pivot pins 41 projecting inwardly from supports 40 and rearwardly supported by ears 43 raised from frame work 39 as shown in Figure 3. The previously mentioned rocker arms 18 ride upon rollers 19 so as to be free for rocking up and down. Preferably, rocker arms 18 are fitted with a flanged track 45 thereon having a lower grooved surface which brackets rollers 19 and confines the rocker arms against sideways movement. It is also desirable to prevent upward displacement of rocker arms 18 from rollers 19, and to this end the side supports 40 are adapted to carry upper stops 46 which override the flanged track 45 and prevent upward movement thereof. As seen in Figures 1, 2 and 5, each support 40 carries a central plate 47 extending upwardly beyond the support a short distance and engaged with an inwardly projecting block 48 which is fastened to the stops 46 so that the latter override track 45. Stops 46 are removably secured to blocks 48 as by screws 49 so that the rocker arms 18 can be lifted from head 14 if it becomes necessary to disassemble the device.

As thus far described, it can be appreciated that the device provides for horizontal and vertical movement of the camera with sturdy and yet substantially frictionless support. Because of the weight and inertia of the camera and the head structure, means must be provided for locking the camera in a desired position so that it will not be free to swing or rock.

At one side of framework 39 within head 14 a brake means 50 is mounted to engage with one of the rocker arms 18 to lock support 16 against rocking movement. As shown in Figure 4, framework 39 is built up internally to form a box 51 which has an internal vertically extending slot 52 therein. Brake means 50 is mounted in slot 52 as is best seen at the right hand end of Figure 5. Preferably brake means 50 comprises a pair of scissor type arms 54 pivotally mounted on a common pivot 55 which is supported in box 51. The upper ends of arms 54 are spaced apart and extended upwardly to form jaws 56 which lie in bracketing relationship to the side faces of rocker flange 45. Each of the jaws 56 is fitted with a friction shoe 57 which is adapted to bear firmly against flange 45 upon inward movement of arms 54, and thus hold the rocker arms 18 and table 16 against rocking movement relative to head 14.

Arms 54 are normally urged apart to a position spaced from engagement with flange 45 by a central compression spring 58 extended between the arms above pivot 55. The lower ends of arms 54 below pivot 55 converge together and are spaced slightly apart by a vertical split 59. On the adjacent faces of the lower ends of the arms 54 are recesses which define therebetween a circular opening 61 bisected by the split 59. The walls of opening 61 are of tapered frusto-conical shape converging towards the front of head 14, and provide, in effect, cam surfaces which can be spread apart to urge the upper ends of arms 54 inwardly against the urging of spring 58. Movement of arms 54 is controlled by hand operated control means as will subsequently be described.

Figure 6:
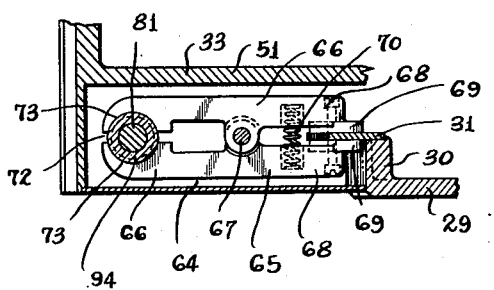
Figure 6 is a sectional detail taken along the line 6—6 of Figure 4.

The supporting box 51, as seen in Figure 4, is extended towards the rear of head 14 and is formed with a second slot 64 in which is mounted brake means 65 that are adapted to lock the head against rotation relative to base 12. As will be remembered, hub 22 is fixed to base 12 and carries gripping flange 31. Brake means 65 are adapted to frictionally engage and disengage with flange 31 as is best seen in the detail of Figure 6.

Brake means 65 are of generally similar construction to brake means 50, and are formed with a pair of scissor type arms 66 pivotally mounted together on a common pivot 67 supported in the walls of slot 64. Arms 66 extend generally horizontally and the inner ends thereof form jaws 68 which are fitted with brake shoes 69 lying in bracketing relationship to flange 31. Between the inner ends of arms 66 is a coil spring 70 which urges the arms apart so that shoes 69 are disengaged from flange 31. The outer ends of arms 66 are spaced apart by a horizontal split 72 and are formed with recesses on the adjacent faces which together define a split circular opening 73. The wall of opening 73 is of tapered frusto-conical shape converging towards the front of head 14, and the opening is considerably larger than the corresponding opening 61 of the brake means 50. It should also be noted that the position of brake means 50 and 65 is such that openings 61 and 73 are in coaxial alignment.

To operate brake means 50 and 65 control means 80, as best seen in Figure 4, extend rearwardly and outwardly from head 14. A central elongated shaft 81 is fitted with an outer control handle 82 and extends into head 14 to the slot 52. An outer control sleeve 83 is coaxial with shaft 81 and extends into head 14 to the slot 64. Control sleeve 83 has a control handle 84 on the outer end which is spaced slightly inwardly from control handle 82 and is centrally bored to permit shaft 81 to pass therethrough.

In order to support shaft 81 and sleeve 83, head 14 is formed with a bearing sleeve 86 which is secured in the framework 39 by a set screw 87 and projects outwardly to rotatably journal sleeve 83. Shaft 81 is in turn rotatably journaled within sleeve 83. On the inner end portion of shaft 81 is a threaded shank 88 which threadedly engages in a threaded bore 89 formed in the box support 51. The tip end of shaft 81 is formed with a tapered nose 90 which is shaped to fit within the opening 61 defined between the brake arms 54. Upon rotation of handle 82, shaft 81 is carried to advance or retract longitudinally so that nose 90 enters within or is withdrawn from opening 61. Forward movement of nose 90 necessarily moves arms 50 outwardly so as to cause brake means 50 to engage with rocker arm 18 and lock table 16 against rocking movement. Upon retraction of nose 90 arms 54 are urged apart by the action of spring 58 to release brake means 50.

The inner end portion of sleeve 83 is similarly formed with a threaded shank 92 which is engaged in a threaded bore 93. The tip end of sleeve 83 is formed as an enlarged tapered annular nose 94 which is adapted to fit within the opening 73 of brake means 65. Advancement of sleeve 83 by rotation of handle 84 causes nose 94 to enter within opening 73 and spread apart the brake arms 66. Shoes 69 engage gripping flange 31 so as to lock head 14 against rotation relative to base 12. Upon retraction of nose 94, arms 66 are released under the urging of spring 70. It should be noted, that shaft 81 passes through nose 94 without engaging the wall of opening 73. Thus the controls of brake means 50 and 65 are entirely independent of each other. Nevertheless, the adjacent position of handles 82 and 84 permits the operator to make both brake adjustments with one hand.

As previously discussed, it is also desirable to provide drag means for retarding the rocking movement of the camera when the vertical brake is released. This is particularly important because of the fact that it may not be possible to hold the center of gravity of the camera over the vertical axis of the table 16 at all times. Accordingly, the camera has a tendency to tilt up or down by itself. Drag means 100 generally are similar to the previously described vertical brake means 50 and are mounted to engage with the opposite rocker arm 18 as is seen in Figures 4 and 5. A box structure 101 is formed within framework 39 to define a vertical slot 102 within which drag means 100 is mounted. The drag means include a pair of scissor arms 103 which are pivotally supported on a pivot pin 104 and urged apart by an upper coil spring 105. The upper ends of arms 103 provide jaws 106 which carry brake shoes 107 in bracketing relationship to flange 45. The lower portions of arms 103 converge together and are separated by a split 108. Recesses are formed in the adjacent surfaces of arms 103 so as to define a central split opening 109. The wall of opening 109 is of frusto-conical shape converging towards the front of head 14.

Drag means 100 are operated by a control shaft 112 projecting rearwardly from head 14 and carrying an outer control handle 113. Shaft 112 has fixed thereon an outer threaded bushing 114 which engages a threaded bore 115 formed in head 14 so that rotation of handle 113 causes longitudinal advancement and retraction of the shaft. Connected to the inner end of shaft 112 is a cylindrical extension 117 which is formed with a tapered nose 118 adapted to fit within opening 109. Advancement of nose 118 causes drag arms 103 to be spread apart to force drag shoes 107 into frictional engagement with the sides of rocker arm flange 45. Upon retraction of nose 118 the spring 105 acts to release shoes 107 from engagement with flange 45.

As can be understood, the purpose of drag means 100 is to provide a slight friction drag on the rocking movement of table 16 and a very fine adjustment is necessary in order to obtain the proper amount of frictional resistance. To this end, a differential screw adjustment is provided on control shaft 112. The inner end of shaft 112 is reduced and formed with a fine threaded shank 120 which engages within a complemental threaded bore 121 within extension 117. The latter is prevented from rotation by a pin 122 riding within a slot 123 in box 101 but is free for limited axial movement. The coaction between the fine threads 120 and the larger threaded bushing 114 provides for fine movement in the usual manner, so that drag means 100 may be accurately adjusted.

While we have thus shown and described in considerable detail a preferred embodiment of the invention, it is to be understood that modifications of design and construction can be made without departing from the scope of the invention. Therefore, we do not wish to be limited to the foregoing description, except as defined in the appended claims.

We claim:

1. A camera cradle head which includes: a base having a horizontal gripping flange extending outwardly therefrom; a head mounted on said base for rotation in a horizontal plane; a support table having a pair of arcuate rocker arms mounted on said head for rocking movement in a vertical plane; brake means pivotally mounted on said head for engagement with said gripping flange to lock said head against rotation relative to said base, said brake means being spring loaded to a disengaged position and pivotally movable to an engaged position; brake means pivotally mounted on said head for engagement with one of said rocker arms for locking said table against rocking movement relative to said head, said brake means being spring loaded to a disengaged position and pivotally movable to an engaged position; control means extending outwardly from said head and having a central control shaft threadedly engaged in said head and formed with a tapered nose portion adapted to pivotally move one of said brake means towards engaged position upon threaded advancement of said shaft, and an outer control sleeve rotatably mounted coaxially with said shaft and threadedly engaged in said head, said sleeve having a tapered nose portion adapted to pivotally move the other one of said brake means towards engaged position upon threaded advancement thereof; and a pair of control handles mounted adjacent each other upon the outer end of said shaft and said sleeve.

2. A camera cradle head which includes: a base having a horizontal gripping flange extending outwardly therefrom; a head mounted on said base for rotation in a horizontal plane; a support table having a pair of arcuate rocker arms mounted on said head for rocking movement in a vertical plane; head brake means comprising a pair of scissor arms pivotally mounted on said head and having jaws adapted to clamp said gripping flange to lock said head against rotation relative to said base, said arms being spring loaded to an open position and having a split tapered opening defined therebetween at the ends opposite said jaws; table brake means comprising a pair of scissor arms pivotally mounted on said head and having jaws adapted to clamp one of said rocker arms to lock said table against rocking movement relative to said head, said arms being spring loaded to an open position and having a split tapered opening defined therebetween at the ends opposite said jaws; and control means extending outwardly from said head and having a central shaft threadedly engaged in said head and formed with a tapered nose portion adapted to fit in one of said tapered openings to pivotally move said brake means towards engaged position upon threaded advancement of said shaft, and an outer sleeve rotatably mounted coaxially with said shaft and threadedly engaged in said head, said sleeve having a tapered nose portion adapted to fit in the other one of said tapered openings to pivotally move said brake means towards engaged position upon threaded advancement of said sleeve.

3. A camera cradle head which includes: a base having a horizontal gripping flange extending outwardly therefrom; a head mounted on said base for rotation in a horizontal plane; pairs of spaced rollers mounted on said head; a support table having a pair of spaced parallel arcuate rocker arms supported on said rollers for rocking movement in a vertical plane; means on said head overriding said rocker arms to hold said table against upward displacement; head brake means comprising a pair of scissor arms pivotally mounted on said head and having jaws adapted to clamp said gripping flange to lock said head against rotation relative to said base, said arms being spring loaded to an open position and having a split tapered opening defined therebetween at the ends opposite said jaws; table brake means comprising a pair of scissor arms pivotally mounted on said head and having jaws adapted to clamp one of said rocker arms to lock said table against rocking movement relative to said head, said arms being spring loaded to an open position and having a split tapered opening defined therebetween at the ends opposite said jaws; control means extending outwardly from said head and having a central shaft threadedly engaged in said head and formed with a tapered nose portion adapted to fit in one of said tapered openings to pivotally move said brake means towards engaged position upon threaded advancement of said shaft, and an outer sleeve rotatably mounted coaxially with said shaft and threadedly engaged in said head, said sleeve having a tapered nose portion adapted to fit in the other one of said tapered openings to pivotally move said brake means towards engaged position upon threaded advancement of said sleeve; and a pair of control handles mounted adjacent each other upon the outer end of said shaft and said sleeve.

4. A camera cradle head which includes: a base having a horizontal gripping flange extending outwardly therefrom; a head mounted on said base for rotation in a horizontal plane; a support table having a pair of arcuate rocker arms mounted on said head for rocking movement in a vertical plane; table brake means comprising a pair of scissor arms pivotally mounted on said head and having jaws adapted to clamp one of said rocker arms to lock said table against rocking movement relative to said head, said arms being spring loaded to an open position and having a split tapered opening defined therebetween at the ends opposite said jaws; head brake means comprising a pair of scissor arms pivotally mounted on said head outwardly of said table brake means and having jaws adapted to clamp said gripping flange to lock said head against rotation relative to said base, said arms being spring loaded to an open position and having a split tapered opening defined therebetween at the ends opposite said jaws, said opening being larger than the opening in said table brake means; control means extending outwardly from said head and having a central shaft extending through the opening in said head brake means in spaced relationship and having a shank portion threadedly engaged in said head, the nose of said shaft being tapered and adapted to fit in the opening in said table brake means to pivotally move said brake means towards engaged position upon threaded advancement of said shaft, and an outer sleeve rotatably mounted coaxially with said shaft and threadedly engaged in said head, said sleeve having a tapered nose adapted to fit in the opening of said head brake means to pivotally move said brake means towards engaged position upon threaded advancement of said sleeve; and a pair of control handles mounted adjacent each other upon the outer end of said shaft and said sleeve.

5. A camera cradle head which includes: a base having a gripping flange extending therefrom; a head mounted on said base for rotation in a horizontal plane; a support table having a pair of arcuate rocker arms mounted on said head and supporting said table for rocking movement in a vertical plane; brake means mounted on said head for engagement with said gripping flange to lock said head against rotation relative to said base, said brake means being resiliently urged to a disengaged position and movable to an engaged position; brake means mounted on said head for clamping engagement with one of said rocker arms for locking said table against rocking movement relative to said head, said brake means being resiliently urged to a disengaged position spaced apart from the sides of said rocker arm and movable inwardly to clamp against the sides of said rocker arm in an engaged position; control means extending outwardly from said head and having a central control shaft formed with a nose portion adapted to move one of said brake means towards engaged position upon threaded advancement of said shaft, and an outer control sleeve rotatably mounted coaxially with said shaft, said sleeve having a nose portion adapted to move the other one of said brake means towards engaged position upon threaded advancement thereof; and a pair of control handles mounted adjacent each other upon the outer end of said shaft and said sleeve.

6. A camera cradle head which includes: a base having a gripping flange extending therefrom; a head mounted on said base for rotation in a horizontal plane; a support table having a pair of arcuate rocker arms mounted on said head and supporting said table for rocking movement in a vertical plane; brake means mounted on said head for engagement with said gripping flange to lock said head against rotation relative to said base, said brake means being normally in a disengaged position and movable to an engaged position; brake means mounted on said head for clamping engagement with one of said rocker arms for locking said table against rocking movement relative to said head, said brake means being normally in a disengaged position spaced apart from the sides of said rocker arm and movable inwardly to clamp against the sides of said rocker arm in an engaged position; control means extending outwardly from said head and having a central control shaft formed with a nose portion adapted to move one of said brake means towards engaged position upon threaded advancement of said shaft, and an outer control sleeve rotatably mounted coaxially with said shaft, said sleeve having a nose portion adapted to move the other one of said brake means towards the engaged position upon threaded advancement thereof; and a pair of control handles mounted adjacent each other upon the outer end of said shaft and said sleeve.

7. A camera cradle head which includes: a base having a gripping flange extending therefrom; a head mounted on said base for rotation in a horizontal plane; a support table having a pair of arcuate rocker arms mounted on said head and supporting said table for rocking movement in a vertical plane; brake means mounted on said head for engagement with said gripping flange to lock said head against rotation relative to said base, said brake means being normally in a disengaged position and movable to an engaged position; brake means mounted on said head for clamping engagement with one of said rocker arms for locking said table against rocking movement relative to said head, said brake means being normally in a disengaged position spaced apart from the sides of said rocker arm and movable inwardly to clamp against the sides of said rocker arm in an engaged position; adjustable drag means mounted on said head for clamping engagement with one of said rocker arms to exert constant frictional resistance to the rocking movement of said table, said drag means being normally in a disengaged position spaced apart from the sides of said rocker arm and movable inwardly to bear against the sides of said rocker arm in an engaged position; control means extending outwardly from said head and having a central control shaft formed with a nose portion adapted to move one of said brake means towards engaged position upon threaded advancement of said shaft, and an outer control sleeve rotatably mounted coaxially with said shaft, said sleeve having a nose portion adapted to move the other one of said brake means towards engaged position upon threaded advancement thereof; and a pair of control handles mounted adjacent each other upon the outer end of said shaft and said sleeve; and separate control means projecting outwardly from said head and operatively connected to said drag means.

References Cited in the file of this patent
UNITED STATES PATENTS

| 1,618,773 | Meyers | Feb. 22, 1927 |
| 1,943,360 | Arnold | Jan. 16, 1934 |
| 2,272,567 | Laube et al. | Feb. 10, 1942 |
| 2,481,717 | Blair | Sept. 13, 1949 |

FOREIGN PATENTS

| 247,457 | Switzerland | Dec. 1, 1947 |